United States Patent [19]

Cubit et al.

[11] Patent Number: 4,709,888

[45] Date of Patent: Dec. 1, 1987

[54] HANGER APPARATUS FOR ELECTRICAL CONDUIT AND THE LIKE

[75] Inventors: Harry T. Cubit, Lansdale; George C. Johnson, Norristown, both of Pa.

[73] Assignee: T. J. Cope, Inc., Collegeville, Pa.

[21] Appl. No.: 782,659

[22] Filed: Oct. 1, 1985

[51] Int. Cl.$^4$ ............................................... F16L 3/03
[52] U.S. Cl. .......................................... 248/73; 52/39; 248/68.1; 248/231
[58] Field of Search ................ 248/73, 68.1, 69, 71, 248/70, 71.4, 220.2, 227, 231, 216.4, 217.1, 62; 211/60.1, 94.5; 52/39, 27

[56] References Cited

U.S. PATENT DOCUMENTS

| | | | |
|---|---|---|---|
| 887,272 | 5/1908 | Robinson | 248/73 X |
| 1,657,939 | 1/1928 | Rockwell | 248/73 |
| 1,787,533 | 1/1931 | Kerschner | 248/73 |
| 2,285,632 | 6/1942 | Urbain | 248/73 X |
| 3,164,255 | 1/1965 | Jay | 211/60.1 |
| 3,888,441 | 6/1975 | Rebentisch | 248/73 |

Primary Examiner—Ramon O. Ramirez
Attorney, Agent, or Firm—Robert C. Podwil

[57] ABSTRACT

Hanger apparatus comprises an elongated strap member adapted to be secured to a support structure, and load supports, such as cradles, coupled to the strap member. The strap member has a series of longitudinally spaced openings, and the load supports have thereon hooks and openings, and projections spaced from the hooks by distances corresponding to the spacing of the openings of the strap member. When operatively disposed, the hooks of the load supports extend through the openings in the strap member, and serve to urge the projections of the load supports into association with openings in the strap member, to create a secure and stable assembly.

16 Claims, 10 Drawing Figures

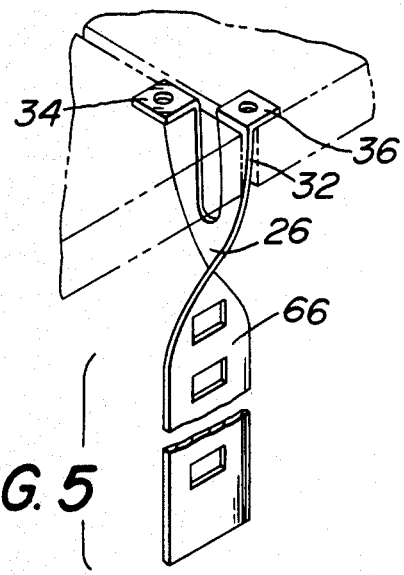
FIG. 5
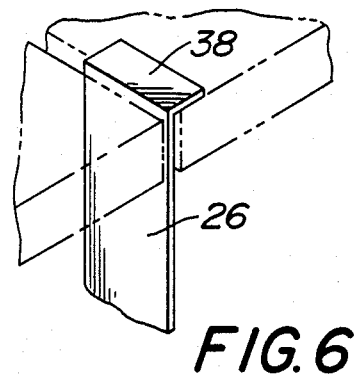
FIG. 6
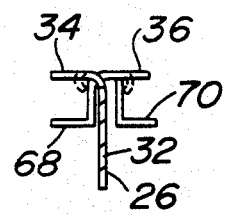
FIG. 8a
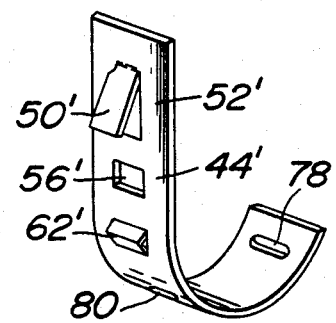
FIG. 7
FIG. 8b
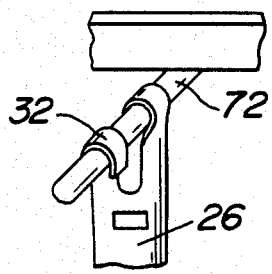
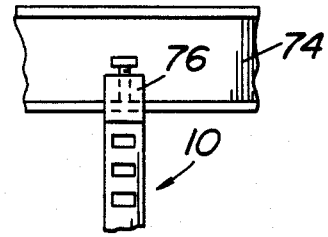
FIG. 8c

HANGER APPARATUS FOR ELECTRICAL CONDUIT AND THE LIKE

BACKGROUND OF THE INVENTION

This invention relates to hanger apparatus for elongated members, such as electrical cables or conduits, raceway wiring systems, or the like. More particularly, the invention relates to apparatus adapted to securely and stably support electrical cables, conduits or the like above suspended ceilings, in suspension from concrete planking, open web joists or other supporting structural members or surfaces. The present invention is particularly well suited to use as a "drop-through" hanger system in buildings of concrete planking construction (as is commonly used in motels, hotels, nursing homes and low-rise office buildings), and provides an alternative to the laying of cables or other wiring adjuncts across the grid of a suspended ceiling. The laying of cables, etc. across a suspended ceiling, a practice formerly followed, was effectively ruled out in recently adopted industry codes. The present invention is also useful for the installation and support of plenum cable, whips, instrument wiring, or duct systems in plenums.

A variety of hanger apparatus have heretofore been proposed. Applicants are aware, for example, of the following U.S. Pat. Nos. 254,333, issued Feb. 28, 1882, to Kane; 799,092, issued Sept. 12, 1905 to Rosenfeld; 2,972,460, issued Feb. 21, 1961 to Kenyon; and 3,218,012, issued Nov. 16, 1965 to Volpe.

The present invention provides unique practical advantages over any known prior art. The apparatus is made from readily available and relatively inexpensive materials, and can be fabricated by inexpensive and conventional forming processes. The apparatus, moreover, can be installed simply and easily, without need for the use of special hardware or tools. The present apparatus has the capability to stack or aggregate supported loads, and its use requires no fasteners. As will be apparent from the detailed description below, assembly of the present hanger apparatus for usage can require nothing more than manual assembly of the various parts.

The present apparatus may be used to support a wide variety of loads. The loads may be supported in a balanced manner so as to minimize stress on the apparatus, although the loads need not necessarily be balanced. They may also be supported in a manner which readily permits directional adjustment of the loads.

In one of its aspects, the present invention relates to a novel load support for use in hanger apparatus of the type disclosed.

SUMMARY OF THE INVENTION

Briefly, in its presently preferred form, the present invention relates to hanger apparatus in which a vertically oriented strap member, which may be coupled to supporting structure such as concrete planking, an open webbed joist, or other supporting structural member, extends vertically downwardly from the supporting structure. The strap member provides a series of longitudinally spaced openings, with which load supports can cooperate. "Load supports", it should be understood, denotes a variety of specific forms of supports within the purview of the invention. For example, the load supports can take the form of cradles, which provide a natural support for conduits and cables of generally circular cross-section. The load supports can also take the form, however, of tray-like cradles, suitable for supporting raceway wiring systems. Other load supports, such as, for example, wiring junction boxes, adapted to cooperate with the strap member in the same manner as the above-mentioned cradles, may be used.

An aspect of this invention is a novel structural and functional interrelationship between load supports associated with opposite faces of a strap member. In this regard, the load supports are provided with hook members, openings so spaced from the hook members and each other as to be correlated with the spacing of the openings of the strap member, and projections so spaced from the hook members as to be correlated with the spacing of the openings of the strap member. In accordance with the invention, the hook of one load support projects through an opening in the strap member and in a load support associated with an opposite face of the strap member, and the interaction of the hooks and load supports urge the projections of both load supports into engagement with the openings. In such an arrangement, the hook member of one load support aids in securing the other load support to the strap member and, in effect, interrelates the two load supports and the strap member in a secure and stable fashion.

There are seen in the drawings forms of the invention which are presently preferred (and which represent the best mode contemplated for carrying the invention into effect), but it should be understood that the invention is not limited to the precise arrangement and instrumentalities shown.

BRIEF DESCRIPTION OF THE DRAWINGS

FIG. 5 is a perspective view, showing another aspect of the invention.

FIG. 6 is a perspective view, showing an alternative embodiment of the invention.

FIG. 7 is a perspective view of an alternative embodiment of a load support in accordance with the invention.

FIGS. 8 $a$, 8$b$ and 8$c$ illustrate alternative ways, among numerous others, by which hanger apparatus in accordance with the present invention may be suspended from a supporting structure.

DETAILED DESCRIPTION

Figure 1:
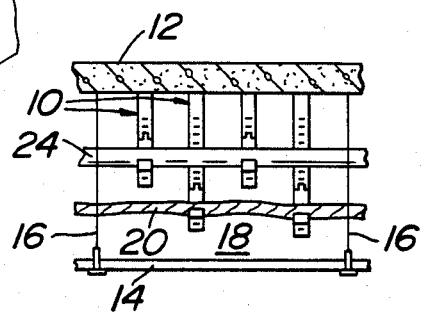
FIG. 1 is an elevation view, showing the manner in which the present invention may be used in conjunction with a supporting structure and a suspended ceiling.

Referring now to the drawings in detail, wherein like reference numerals indicate like elements, there is seen in FIGS. 1 through 4 novel hanger apparatus designated generally by the reference numeral 10.

FIG. 1 illustrates the manner in which the apparatus 10 can be used to suspend elongated members, such as electrical conduit and the like, from a supporting structure. In FIG. 1, merely by way of example, the supporting structure is a concrete deck 12, which, it will be understood, is part of a larger building structure. The deck 12 provides a true ceiling (and floor for an upper story), from which a suspended ceiling 14 is hung by conventional hangers 16 or the like.

Within the plenum 18 between the ceiling 14 and the deck 12, wiring and other utilities are run. The wiring may take the form of the exemplary cable 20, or other wiring methods, such as, for example, a raceway 24. Hanger apparatus 10, in accordance with this invention, is provided at spaced intervals along the cable 20 and raceway 22.

Use of the present hanger apparatus 10 eliminates the need for the former practice of laying cables or raceways across the grid of a suspended ceiling, a practice in any event no longer permitted by industry codes. It will be appreciated that the panels which form the ceiling 14 are typically designed to allow access to the plenum 18, and that the above-described arrangement permits displacement of the panels of the ceiling 14 for access without disturbing the hanger apparatus 10 and the associated cable 20 or, as the case may be, raceway 24.

Figure 2:
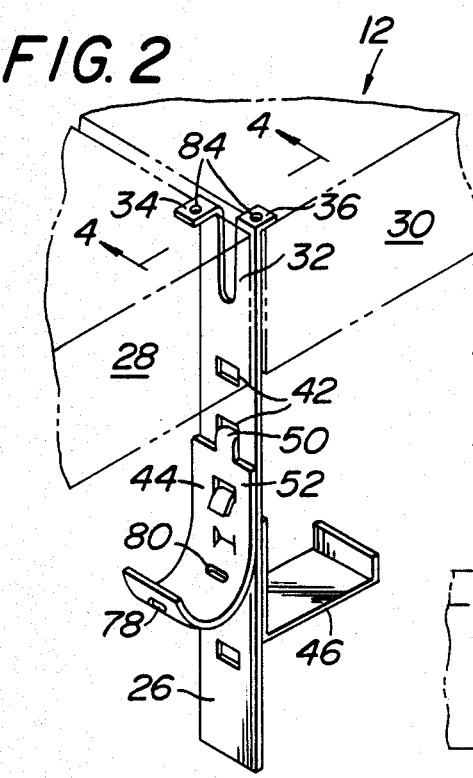
FIG. 2 is a perspective view, showing apparatus in accordance with the invention.

Referring now to FIG. 2, the hanger apparatus 10 will be described in greater detail.

The hanger apparatus 20 includes a generally vertically oriented strap member 26, supported by a load-bearing structure. In FIG. 2, the load-bearing structure is the above-mentioned deck 12. The strap member 26 extends between and is supported by precast concrete planks 28 and 30 which form the deck 12.

For such an installation, the strap member 26 may be provided, as is illustrated in FIG. 2, with a bifurcated end portion 32, which terminates in a pair of tabs 34 and 36, extending in opposite directions. Alternatively, referring to FIG. 6, the strap member 26 may be provided with a single generally horizontally extending tab 38.

Installation of the strap member 26 is accomplished by simply dropping or tapping the strap member 26 through the slot between the planks 28 and 30 from above. If required or desired, the strap member 26 may be held fast by the application of a sealer to the slot between the planks 28 and 30. In practice, the strap 26 can often be dropped through the slot by hand, but, if force is necessary, light tapping of a hammer is usually sufficient to position the strap member 26 as desired. Because it is installed from above the deck 12, no ladders and no special tools are needed for installation of the strap member 26.

In those instances in which a surface sealer or grout is applied to the upper surface of the deck 12, a coat 40 of such material (best seen in FIG. 4) may be used, covering and encapsulating the tabs 34 and 36, or, as the case may be, the tab 38.

Figure 3:
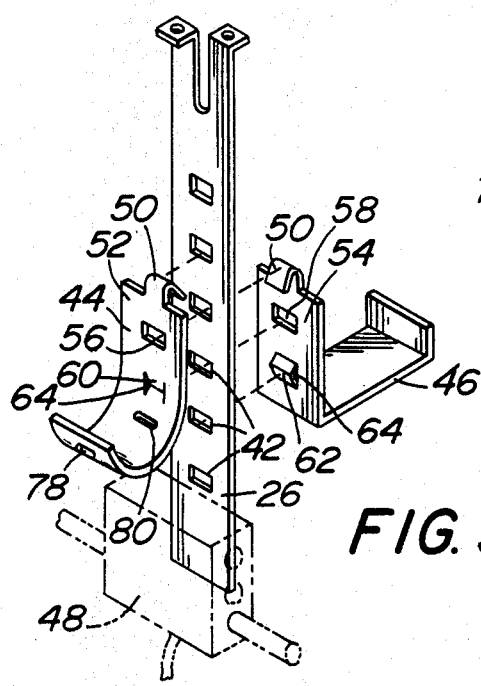
FIG. 3 is an exploded view, in perspective, showing other aspects of the invention.
Figure 4:
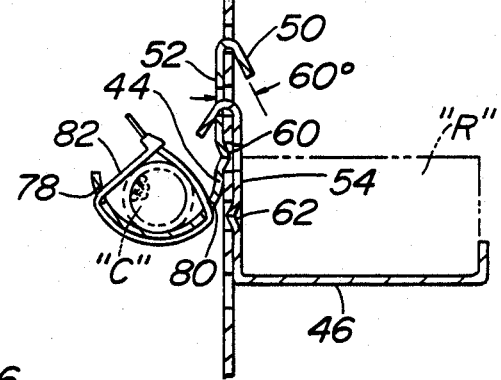
FIG. 4 is a cross-sectional view, taken along the line 4—4 in FIG. 2.

Referring now to FIGS. 2 through 4, the strap member 26 is provided with a series of longitudinally spaced openings 42. The openings 42 provide a means whereby load supports, such as cradles 44 and 46, or wiring boxes 48, may readily be coupled to and supported from the strap member 46. In this regard, each of the load supports, such as, for example, the cradles 44 and 46, is provided with a hook member 50, so configured and dimensioned as to be able to fit through the openings 42 of the strap member 26 to hang the load support from the strap member 26.

In FIGS. 2, 3, and 4, the cradle 44 is one which is configured to support a cable (seen in phantom as "C" in FIG. 4), and the cradle 46 is configured to support a raceway ("R"). It should be understood that in practicing the invention, various forms of cradles 44, 46 may be used as desired. Thus, for example, if it were necessary or desirable to use a strap member 26 to support a pair of cables, two cradles 44 could be used. If it were necessary or desirable to support a pair of raceways, two cradles 46 could be used.

FIGS. 3, 4 and 7 illustrate two variations in the fabrication of a hook member 50 in accordance with the invention.

Referring first to FIGS. 3 and 4, the hook member 50 is formed as an extension from the upper edge of the exemplary cradle 44 or 46. As is seen in FIG. 4, the hook member 50 is offset from a shank or main body portion 52 of the cradle 44 by angle of approximately sixty degrees (60°). When the hook member 50 is so configured, insertion of the hook member 50 through an opening 42 of the strap member 26, and the application of a downward load on the cradle 44, causes the hook member 50 to "cam" or wedge the shank or main body portion 52 of the cradle 44 into close facial contact with the strap member 26.

The hook member 50 of the cradle 46 and the hook member (not shown) of the wiring box 48 are configured similarly to the above-described hook member 50 of the cradle 44. Thus, in the case of the cradle 46, seen in FIGS. 3 and 4 the hook member 50 is offset from a shank or wall portion 54 of the cradle 46 by an angle of approximately 60°, and the application of a downward load to the cradle 46 likewise causes the shank or wall portion 54 of the cradle 46 into close facial contact with the strap member 26.

FIG. 7 illustrates an alternative form of cradle 44, in which elements corresponding to those of the cradle 44 are designed by liked primed (') reference numerals. In the embodiment shown in FIG. 7, a hook member 50', rather than being fashioned as an extension from the upper edge of the shank or body portion 52', is stamped on three sides from the material of the shank or main body portion 52', and bent from the general plane of the shank or main body portion 52' by a desired angle of offset. With the embodiment shown in FIG. 7, the angle between the hook member 50' and the shank or main body portion 52 may be made more acute than is practical with the first-described embodiment. A more acute angle tends to provide a stronger wedging action between the hook member 50' and the strap member 26 with which it is associated.

An aspect of the present invention is the manner in which load supports disposed on opposite faces of the strap member 26 are structurally interconnected with each other to enhance the security of their interconnection with the strap member 26, and to provide a convenient means for applying to the strap member 26 a balanced load.

As is perhaps best seen in FIGS. 2, 3 and 4, the shank or main body portion 52 of the cradle 44 is provided with an opening 56 of a shape and size correlated generally to the shape and size of the openings 42 in the strap member 26. Similarly, the shank or wall portion 54 of the cradle 46 may be provided with a like opening 58. The spacing of the hook members 50 and the respective openings 56 and 58 of the cradles 44 and 46 is correlated to the spacing of the openings 42 in the strap member 26. For example, in one presently contemplated commercial embodiment, the openings 42 in the strap member 26 are spaced on one half inch centers, the horizontal center lines of adjacent openings 42 being spaced by a nominal one-half inch. The openings, in that embodiment are rectangular, and of a size $\frac{1}{4}'' \times 7/16''$. In a cradle 44 or 46 intended to cooperate with such a strap member 26, the opening 56 of the cradle 44 or, as the case may be, the opening 58 of the cradle 46, is located so that its horizontal center line is approximately one inch below the hook member 50. When thus located, the openings 56 and 58 will align with openings 42 of the strap member 26 when the cradles 44, 46 are hung from and engaged with the strap member 26.

As is best seen in FIG. 4 and also apparent in FIG. 2, the hook member 50 of one load support, the cradle 46 in FIG. 4, extends through the opening 42 of the strap member 26 as well as the opening 56 of the load support (the cradle 44 in the illustrated case) associated with the opposite face of the strap member 26. In such an arrangement, the above-mentioned wedging or camming action produced by the hook members 50 (or 50') tends to draw the load supports (cradles 44 and 46) associated with opposite faces of the strap member 26 into snug engagement with the strap member 26, and indirectly with each other.

The load supports, such as the cradles 44 and 46, are also provided with projections 60 and 62, respectively, spaced from the respective openings 56 and 58 by distances corresponding to the spacing between the openings 42 of the strap 26. As is perhaps best seen in the cross-sectional view of FIG. 4, when the cradles 44 and 46 are associated with the strap member 26, the projections 60 and 62 project into respective openings 42 of the strap member 26, and by engaging the openings, prevent lateral swaying of the cradles 44, 46 or other load supports with respect to the strap member 26. The result is a strong, suitably stable and rigid yet easily made structural interconnection, which is effected by simply assembling the parts, without the need for special tools or fasteners of any kind.

As is perhaps best seen in FIGS. 3 and 7, one presently preferred technique for forming the projections 60 and 62 in the cradles 44 and 46 is to stamp form the shank 52, 52', 54 a generally "H"-shaped slit 64, and deform a central portion of the slit out of the plane of the shank 52, 52', 54 in the direction of the hook member 50, 50'. It should be apparent that any tendency of the cradle 44, 44', 46 or other load support to sway with respect to the strap member 26 will be resisted by contact between the lateral edges of the projections 60, 62 and the sides of the openings 42 in the strap member 26. The above-mentioned wedging action created by the hook members 50, 50' also tends to ensure contact between the projections 60, 62 and the openings 42.

From the above description, it should be apparent that use of the present hanger apparatus 10 affords to a builder or contractor great flexibility in the installation of cable and raceway wiring systems. The strap member 26 may be provided in a variety of lengths, ranging from a few inches (in one present form, 4¾") to substantially more than a foot (in one present form, 19¾"). Within the principle of the invention, practical and desirable variations in specific dimensions are numerous. The spaced openings 42, moreover, provide a wide range of selective vertical adjustment for the load supports along the length of a strap member 26. The juxtaposition of load supports on opposite sides of the strap member 26 provides, moreover, a desirable balancing of the loads on the strap member 26. This reduces or wholly eliminates undesired bending moments on the strap member 26, and enhances the load-carrying ability of the apparatus 10.

The strap member 26 is preferably made from easily worked, readily available sheet or strip material, such as, in one presently preferred embodiment, 16 ga. galvanized steel. The cradles 44 and 26 may be made from similar materials.

FIG. 5 illustrates another aspect of the hanger apparatus 10 which enhances its versatility. This Figure illustrates a situation in which a lower portion 66 of the strap member 26 has been twisted to orient the load supports to be associated with it in a desired direction. Because the strap member 26 may be made from relatively light gauge sheet material, such an adjustment of the strap member 26 can readily be accomplished by an installer, using ordinary or vise grip pliers or the like.

FIGS. 8a, b and c illustrate other alternative techniques by which a strap member 26, and hence, the hanger apparatus 10, may be affixed to various kinds of supporting members. FIGS. 8a and 8b illustrate the manner in which a hanger apparatus 10 may be associated with an open web joist structure. In FIG. 8a, a strap member 26, the end portion 32 of which is configured like that of the strap member 26 shown in FIG. 2, has oppositely disposed tabs 34 and 36. The strap member 26 is in this instance, dropped between the spaced bottom chords 68 and 70 of the joist, with the tabs 34 and 36 resting on the joist. Optionally, as is indicated in dotted lines in FIG. 8a, the tabs may be bent downwardly to more tightly engage the chords 68 and 70. In another alternative, as is seen in FIG. 8b, the end portion 32 may be twisted around a joist diagonal 72.

In FIG. 8c, a hanger apparatus 10 is shown attached to a structural beam or channel 74 by means of a beam clamp 76.

Referring once again to FIGS. 3 and 4, provision may be made in the load supports, such as the cradles 44 and 46, for means to secure the supported load to the load support. For this purpose, the illustrated cradle 44 is provided with slots 78 and 80, through which a cable tie 82 (such as the commercially available ties sold under the trademark "Ty-Rap" by Thomas & Betts Co.) may be passed.

Techniques other than those specifically illustrated and described above may be used to secure the strap 26 to a support. For example, referring to FIG. 2, holes, such as the holes 84 in the tabs 34 and 36 (typically of ¼" D.) may be used to secure the strap to a support structure using conventional bolts and anchors.

The present invention may be embodied in other specific forms without departing from its spirit or essential attributes. Accordingly, reference should be made to the appended claims rather than the foregoing specification, as indicating the scope of the invention.

We claim:

1. Hanger apparatus for suspending elongated members from supporting structures, comprising: a strap member having respective opposite faces thereof and adapted to be coupled to a supporting structure, said strap member having a series of longitudinally spaced openings therein; a first load support coupled to and supported by said strap member in association with one face thereof, said load support having a hook member thereon, an opening therein spaced from said hook member by a distance corresponding to the spacing between said openings in said strap member, and a projection thereon extending the direction of said hook member and spaced from said hook member by a distance corresponding to the spacing between said openings in said strap member; and a second load support coupled to and supported by said strap member in association with the other face thereof and having a hook member thereon, said hook member of said second load support extending through one of said openings in said strap member and said opening in said first load support, whereby said hook member of said second load support operatively interconnects said load supports and said strap member.

2. Apparatus in accordance with claim 1, and a projection on said second load support extending in the direction of said hook member of said second load support, said projection being spaced from the hook member of said second load support by a distance corresponding to the spacing between said openings in said strap member, so that said projection operatively engages one of said openings in said strap member when said second load support is operatively disposed.

3. Apparatus in accordance with claim 2, wherein said second load support has an opening therein spaced from said hook thereon by a distance corresponding to the spacing between said openings in said strap member, said projection on said second load support being spaced from said opening in said second load support by a distance corresponding to the spacing between said openings in said strap member.

4. Apparatus in accordance with claim 2, wherein said hook members are disposed adjacent to upper portions of said load supports.

5. Apparatus in accordance with claim 4, wherein said strap member and said load supports are made of sheet metal.

6. Apparatus in accordance with claim 2, wherein said load supports comprise cradle members.

7. Apparatus in accordance with claim 6, wherein said strap member and said load supports are made of sheet metal.

8. Apparatus in accordance with claim 2, and means on the upper portion of said strap member for securing said strap member to a support structure, said means comprising a portion of said strap member displaced from and angularly offset with respect to the general plane of said strap member.

9. Apparatus in accordance with claim 8, wherein said strap member and said load supports are made of sheet metal.

10. Apparatus in accordance with claim 8, wherein said angularly offset means comprises a bifurcated portion of said strap member, said bifurcated portion having a pair of tab members, each of said tab members being bendable independently of the other.

11. Apparatus in accordance with claim 8, wherein said strap member and said load supports are made of sheet metal, said hooks on said load supports comprising a tab offset from a body portion on said load support.

12. For use in combination with a hanger apparatus comprising a strap member having a series of longitudinally spaced openings therein, a load support, said load support comprising a shank portion, a load supporting portion operatively coupled to said shank portion, and a hook member operatively coupled to said shank portion and adapted to engage the openings in the strap member to operatively couple said load support thereto; said shank portion having an opening therein spaced from said hook member by a distance corresponding to the spacing between openings in the strap member and of a size corresponding to the size of hook member; and said shank portion having a projection extending therefrom in the direction of said hook member and spaced from said hook member by a distance corresponding to the spacing between said openings in said strap member.

13. Apparatus in accordance with claim 12 wherein said load supporting portion extends from a lower portion of said shank portion, and said hook member is associated with an upper portion of said shank portion.

14. Apparatus in accordance with claim 13, wherein said load support is made of sheet metal, said hook member and said projection being struck out from the plane of said sheet metal.

15. Apparatus in accordance with claim 14 wherein said load supporting portion comprises a hook member adapted to receive an electrical wire or conduit, and spaced openings in said hook member to facilitate tying of the load to said load supporting portion.

16. Apparatus in accordance with claim 14 wherein said load supporting portion comprises a tray-like member adapted to support a raceway.

* * * * *